P. J. THULL.
EXCAVATING, GRADING, AND CONVEYING MACHINE.
APPLICATION FILED FEB. 7, 1907. RENEWED JUNE 2, 1908.
908,820.
Patented Jan. 5, 1909.
6 SHEETS—SHEET 1.
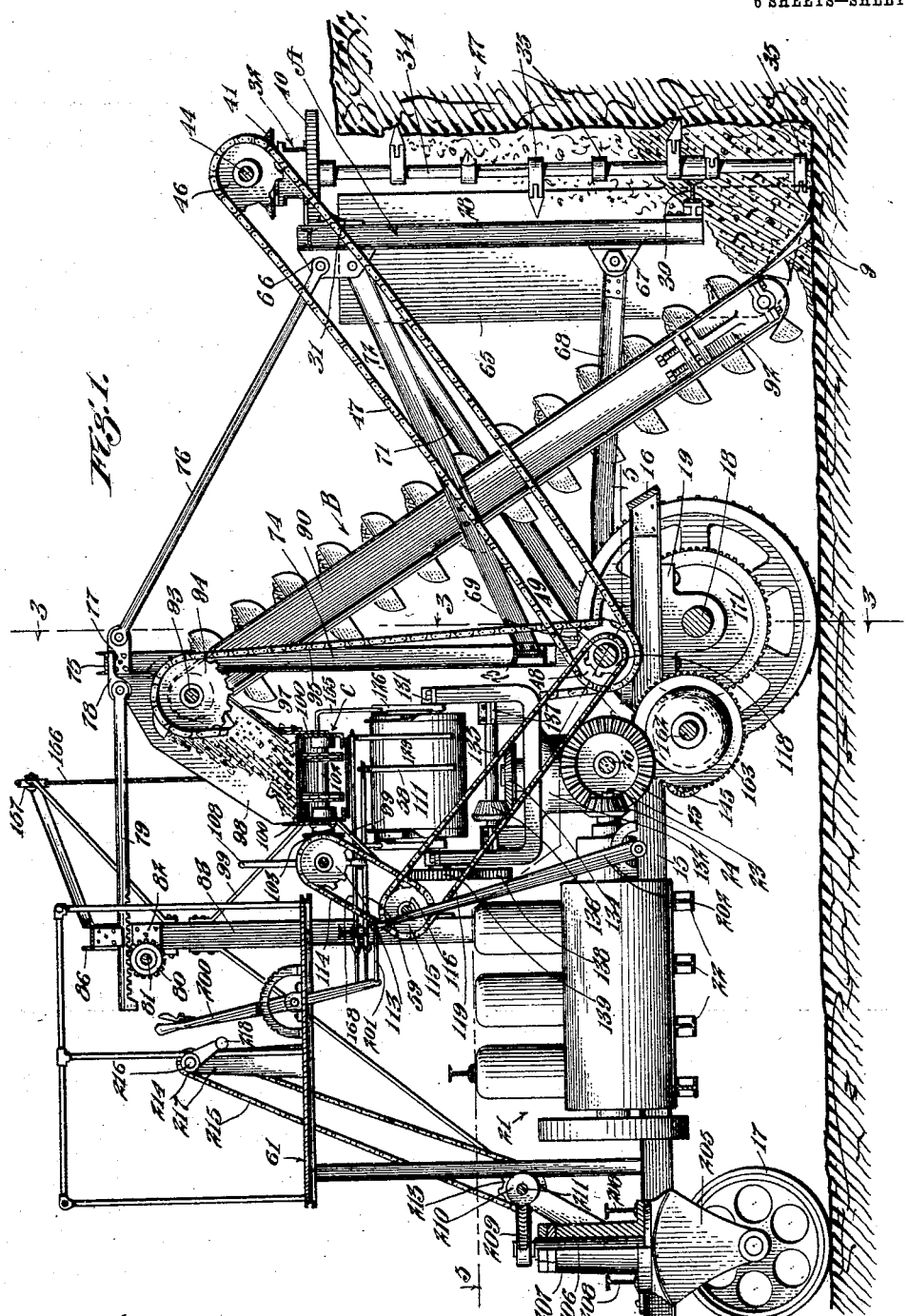

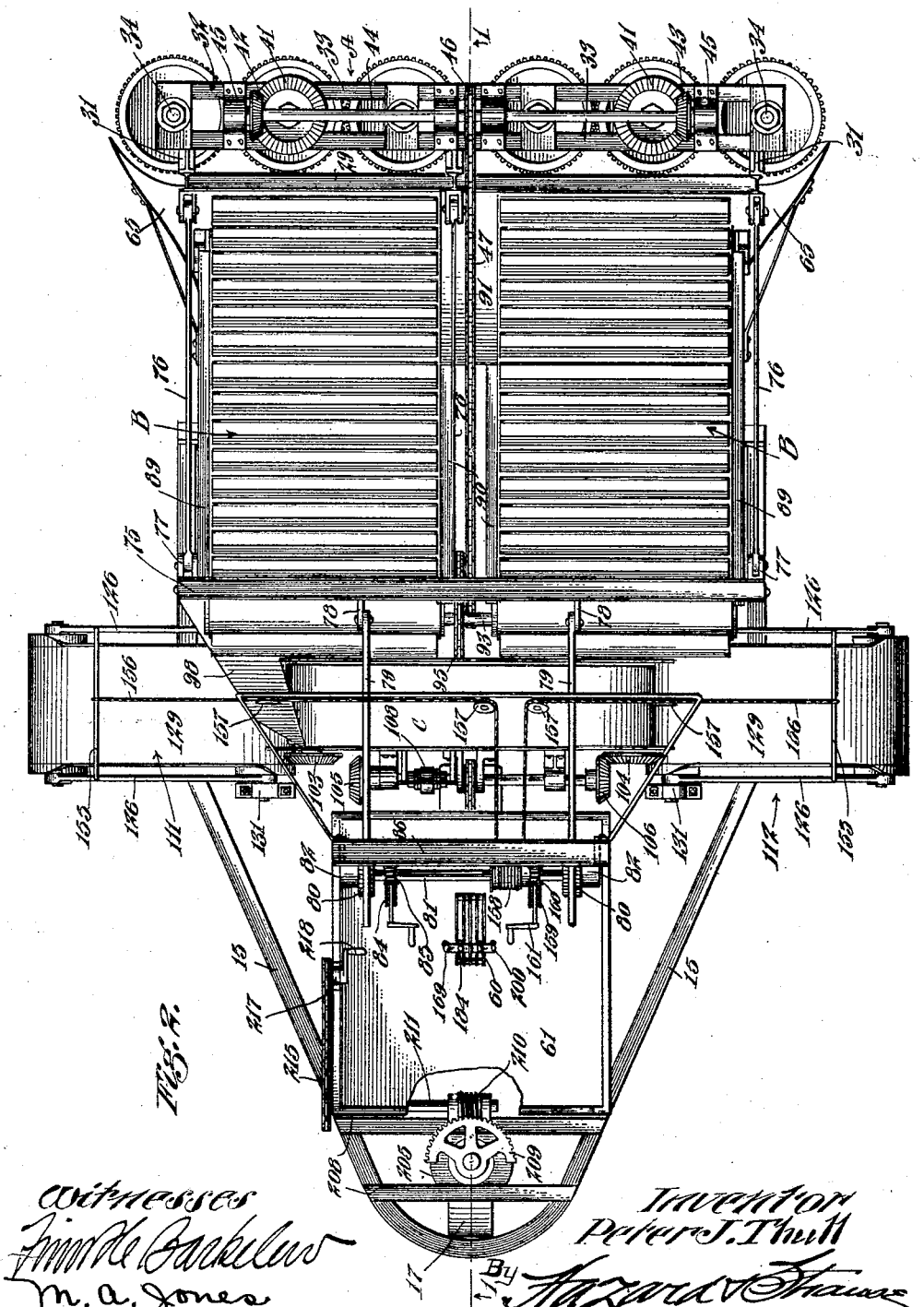

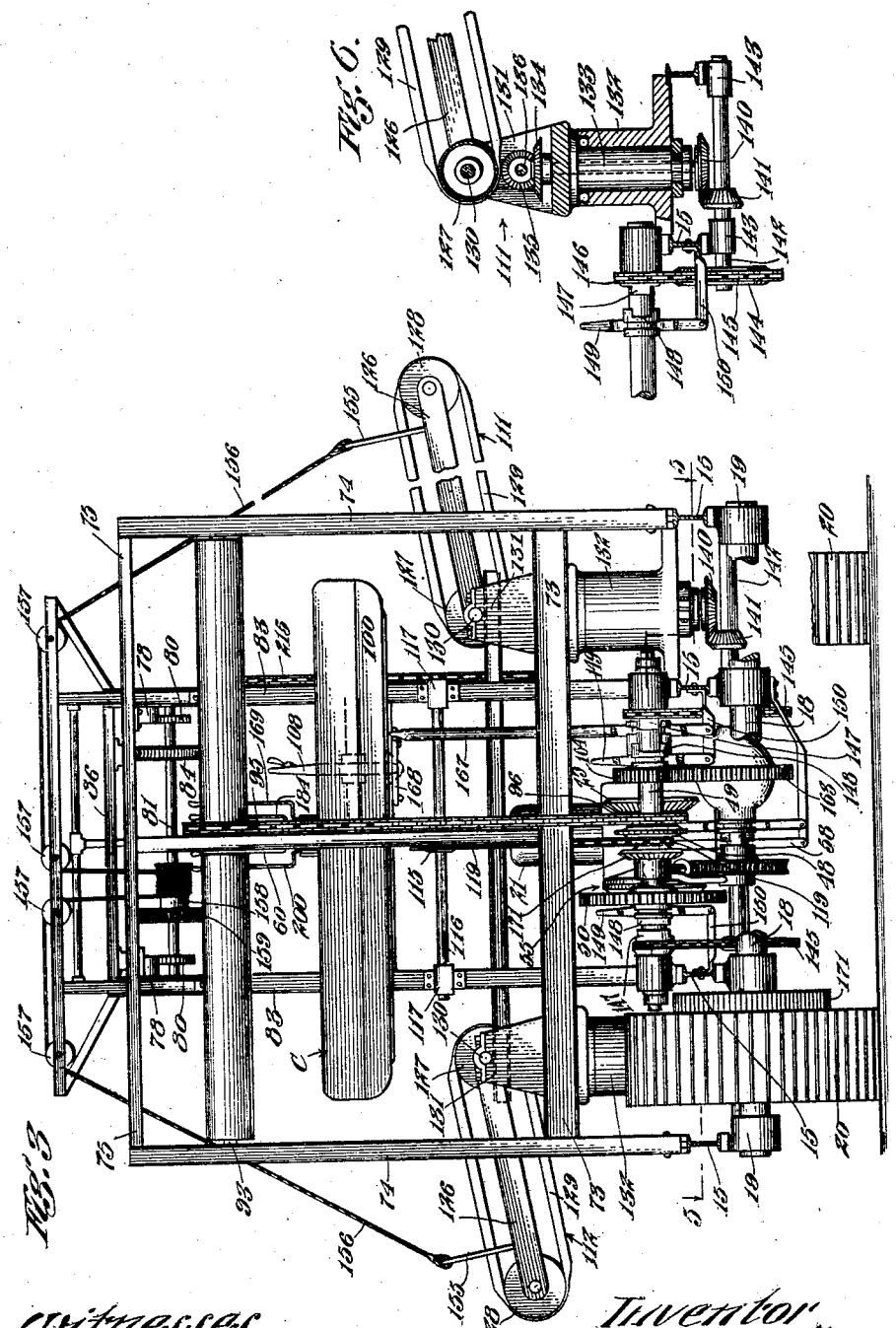

P. J. THULL.
EXCAVATING, GRADING, AND CONVEYING MACHINE.
APPLICATION FILED FEB. 7, 1907. RENEWED JUNE 2, 1908.
908,820.
Patented Jan. 5, 1909.
6 SHEETS—SHEET 4.
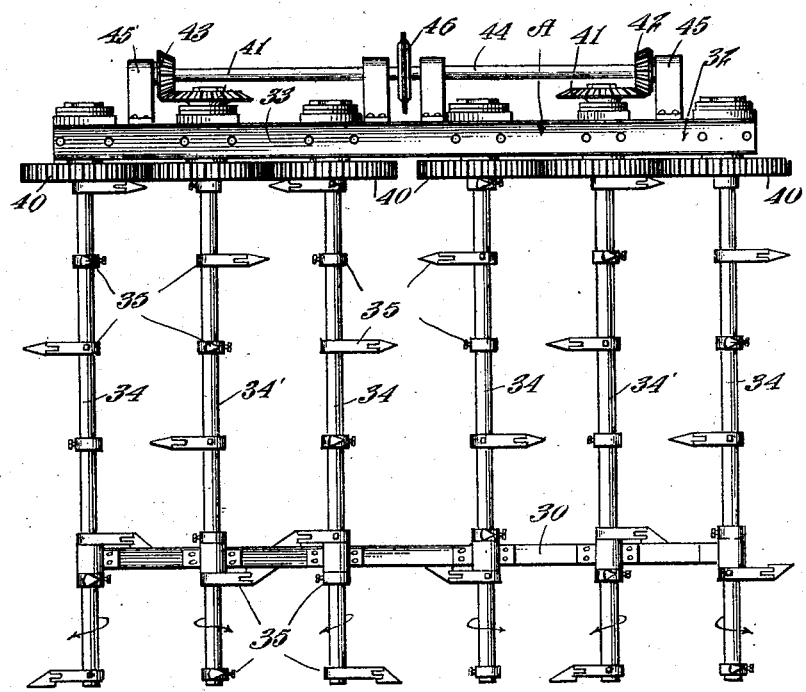
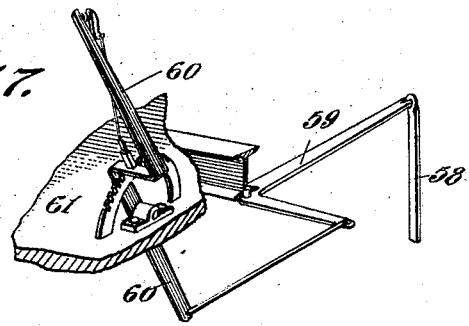

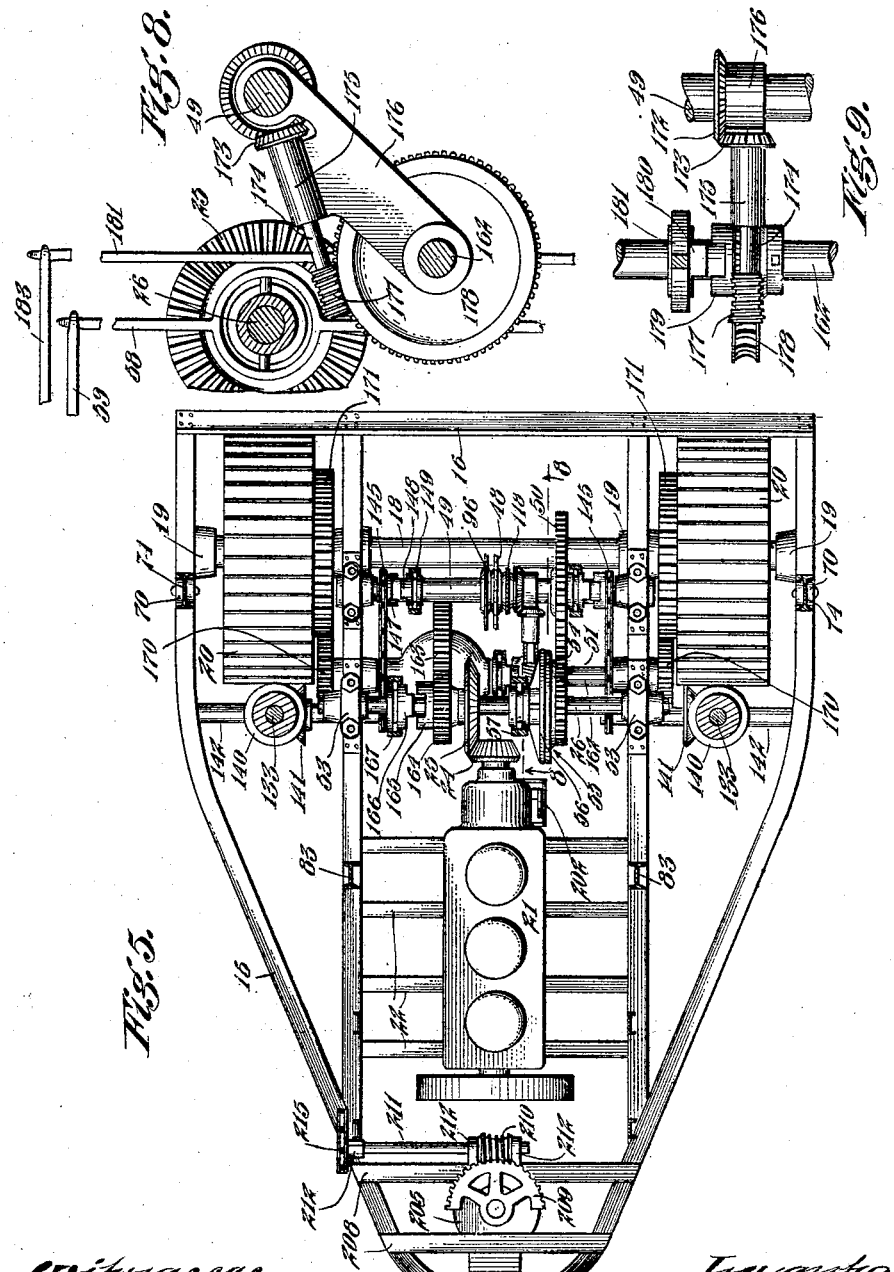

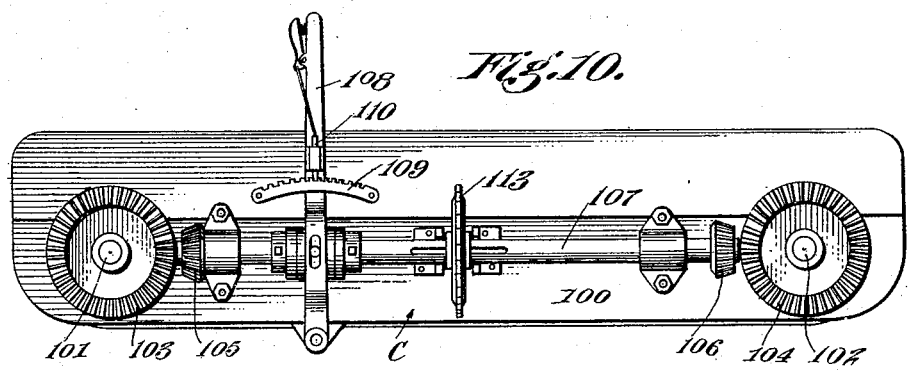
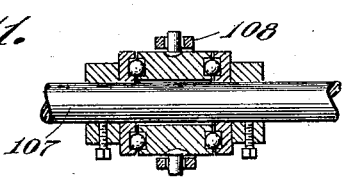
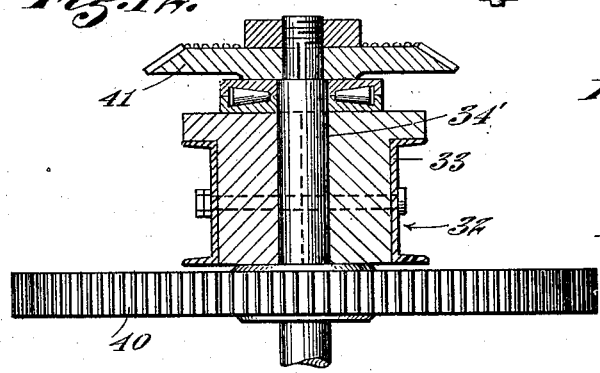
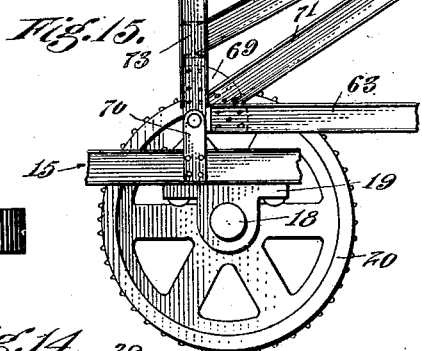
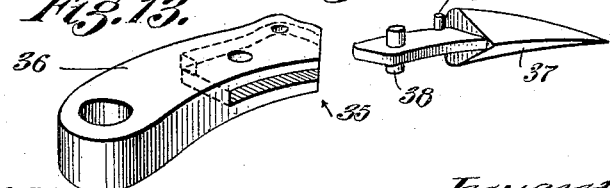

UNITED STATES PATENT OFFICE.

PETER J. THULL, OF LOS ANGELES, CALIFORNIA.

EXCAVATING, GRADING, AND CONVEYING MACHINE.

No. 908,820.     Specification of Letters Patent.     Patented Jan. 5, 1909.

Application filed February 7, 1907, Serial No. 356,239. Renewed June 2, 1908. Serial No. 436,226.

*To all whom it may concern:*

Be it known that I, PETER J. THULL, a citizen of the United States, residing at Los Angeles, in the county of Los Angeles and State of California, have invented new and useful Improvements in Excavating, Grading, and Conveying Machines, of which the following is a specification.

My invention relates to that class of self propelled machines in which the cutting, hoisting, and the conveying of the soil from an embankment is effected simultaneously, and it consists of a plurality of rotary cutting picks and conveyers actuated simultaneously by mechanism secured to the apparatus.

A further and special object of this invention is to provide a machine of the class described which can be fed forwardly as fast as the embankment is removed by the rotary picks.

Another object of my invention is to provide means whereby the soil may be conveyed from either side of the machine directly into wagons.

A further object of my invention is to provide means whereby the various sub-mechanisms of the apparatus are controlled from a single point of vantage.

A further object of my invention is to provide an apparatus which by means of the vertical adjustment of the rotary cutting frame, I am enabled to make excavations and to cut upwardly from the bottom of an excavation.

I accomplish these objects by means of the device described herein and illustrated in the accompanying drawings, in which:—

Figure 1 is a longitudinal vertical section of my complete apparatus taken on line 1—1 of Fig. 2. Fig. 2 is a complete plan of my improved apparatus. Fig. 3 is a sectional view taken on line 3—3 of Fig. 1, with the main elevator removed. Fig. 4 is a front elevation of the cutting frame showing the rotary picks secured thereto. Fig. 5 is a sectional plan taken on line 5—5 of Fig. 1. Fig. 6 is an enlarged detail of a portion of one of the side elevators showing its connection to the counter shaft. Fig. 7 is a detail of one of the controlling levers showing the method of securing the levers to the platform. Fig. 8 is an enlarged detail section taken on line 8—8 of Fig. 5 illustrating the mechanism for feeding the machine forwardly during its operation. Fig. 9 is an enlarged detail plan view of the mechanism described in Fig. 8. Fig. 10 is a rear side elevation of the transverse conveyer, showing the mechanism for changing the direction of the conveyer. Fig. 11 is a sectional detail of the lever bearing shown in Fig. 10. Fig. 12 is a sectional detail of one of the upper bearings on the vertical pick shafts. Figs. 13 and 14 are perspective views of one of the pick arms which are secured to the vertical pick shafts, and one of the detachable pick points. Fig. 15 is a detail of the frame carrying the cutting mechanism, showing the method of pivoting the frame to the apparatus.

My improved apparatus is provided with a suitably constructed frame 15, preferably formed I beams properly tied together by means of plates and bars 16. Connected to the front end of frame 15 is a pivoted guide wheel 17, which is connected to suitable steering means that will be more fully described hereinafter. The rear end of the frame is supported on the rear axle 18 which is rigidly secured in bearing blocks 19 secured to the under side of frame 15. This axle carries wheels 20 of the usual traction type. Near the front end of frame 15 is an engine 21, preferably of the internal combustion type, which is mounted on a plurality of cross I beams 22, which are secured to the under side of frame 15. Secured to one end of the main shaft 23 of the engine is a beveled pinion 24 which meshes with a beveled gear 25 rigidly secured to a main drive shaft 26, through the medium of which motion is communicated to the various mechanisms of which the apparatus is composed.

In the operation of my improved apparatus it is first moved rearwardly until the frame, which I will designate A and which carries the cutters, is in close proximity to the bank 27 upon which it is desired to operate. The frame A is then raised or lowered by means that will be described more particularly further on, in the desired position relative to the bank. Cutting frame A is preferably composed of a plurality of vertical I beams 28, here shown as three in number, and which are tied together at their tops and bottoms by transversely disposed I beams 29 and 30. Rigidly secured to the top of each of beams 28 are brackets 31, which are adapted to support a gear carrying frame 32. Frame 32 is preferably composed of a plurality of angles and plates 33 suitably bolted together, and is adapted to carry a plurality of bearings, preferably of the roller type in which rotate a series of vertically disposed shafts 34, to which are rigidly secured at right angles thereto a series of cutter arms 35. These cutters preferably consist of arms 36 horizontally slotted on their outer end for the reception of the cutting tools 37, which are in this instance illustrated as picks, the picks being detachably secured to the arms 36 so as to facilitate their resharpening when they become dull or worn. Cutting tools are held in engagement with the arms 36 by means of bolts 38, and a pin 39 preferably formed of soft steel. This pin 39 is for the purpose of releasing the picks from rigid engagement with arms 36 whenever they strike an immovable object, the tendency being to shear the pin off, and thus release and save the cutting tool from damage. Vertical shafts 34 are adapted to be rotated in unison, and each shaft is provided on its upper end immediately below the bearing frame 32 with a gear wheel 40. These gear wheels and shafts are preferably divided, as shown in Fig. 4 of the drawings, into a series of three, each alternate one of which rotates in an opposite direction, as will be noted by reference to Fig. 4 of the drawings.

Rigidly secured to the upper ends of shafts 34' are bevel gears 41, that are adapted to mesh with similar bevel gears 42 and 43 that are rigidly secured to a shaft 44, mounted in bearings 45 secured to the upper face of bearing frame 32. Rigidly secured to shaft 44 and preferably in the center thereof is a driving sprocket 46, connected by chain 47 to a sprocket 48 that is rigidly secured to a power shaft 49, mounted transversely in bearings secured to frame 15.

50 designates a gear wheel rigidly secured to shaft 49, which meshes with a gear wheel 51 rigidly secured to a shaft 26. Shaft 26 is mounted in bearings 53 secured to the frame of the apparatus. Rigidly secured to one side of gear wheel 51 is a member 54 of a friction plate clutch 55, that is adapted to engage with the other member 56 of the clutch. Member 56 is adapted to be thrown into or out of engagement with the other clutch member by means of a yoke 57 which is connected to a vertically disposed arm 58 pivoted to frame 15. Upper end of arm 58 is pivotally connected to a horizontally disposed bell crank 59, connected to the lower end of controlling lever 60, mounted on the operating platform 61. By means of this friction clutch and operating lever, the revoluble cutting tools may be thrown into or out of operation instantly. Shaft 26 is continuously driven through the medium of bevel gear wheel 25 which meshes with beveled pinion 24 rigidly secured to one end of the engine shaft 23. Secured to the frame of the machine at the rear of the cutting frame, and at the outer ends thereof, are guard shields 65 that are adapted to guide the soil removed by the cutting tools into the path of the elevators, as will be more particularly described hereinafter.

Rear face of bars 28 is provided with brackets 66 and 67 at the top and bottom thereof, and pivotally secured to each bracket 67 is an I beam 68 which is rigidly secured to plates 69, which are pivotally mounted in bearings 70 rigidly secured to the frame of the machine. Pivotally secured to each bracket 66 is an I beam 71 whose other end is rigidly secured to plate 69. Pivotally secured to each bracket 66 and at the same point at which I beams 71 are secured, is an I beam 72. The outer end of these beams 72 is rigidly secured to a transversely extending I beam 73 which is rigidly secured to vertically disposed I beams 74, the lower ends of which are secured to pivoted plates 69. The tops of beams 74 are connected with a channel 75, which serves to tie the beams securely together. Pivotally secured to the upper end of each of the brackets 67 is a bar 76, whose other end is pivotally secured to brackets 77, which are secured to the vertical beams 74. Channel 75 is provided on its under face with a number of brackets 78, to which are pivotally secured rack bars 79 which engage with pinions 80. These pinions are rigidly secured to a shaft 81 which is revolubly mounted in brackets 82 secured to vertically disposed beams 83, which are rigidly secured at their lower ends to frame 15. Rigidly mounted on shaft 81 is a worm wheel 84 which meshes with a worm 85 which is revolubly mounted on the channel beam 86 which is rigidly secured in any well known manner to the vertical beams 83.

By means of the above described mechanism the operator may raise or lower the cutting frame A to any desired position, thus enabling him to operate on a level or on an up or down grade.

In the rear of the cutting frame A is a plurality of elevators B, preferably of the link belt type, which are adapted to convey the material that is removed from the bank 27 upwardly to a cross conveyer which will be more particularly described hereinafter. These elevators preferably consist of a pair of channel irons 89 and 90, each of which are rigidly secured to beams 72 and 68.

It will be noted from the foregoing construction that when the cutting frame A is adjusted, the elevators will be raised or lowered with the frame, thus maintaining relatively the same distance from the bottom of the cutting frame. Located at the lower end of the elevators and between them is an apron or shield 91, the purpose of which is to keep the soil that is removed from the bank by the revoluble cutters from falling between the elevators. At the lower end of each of the channels 90 which form the sides of the elevators is a chain tightening device 92; this device may be of any well known construction as it does not in any manner form a part of my invention. The side channels of the elevators extend upwardly, preferably on an incline, and are secured to a revoluble shaft 93, upon the center of which is mounted a sprocket wheel 94. Sprocket 94 is connected by chain 95 to sprocket 96, rigidly mounted on shaft 49, which is driven through the medium of the gearing as heretofore described in the description of the operation of the cutting mechanism.

Secured to the top of the elevator frames and directly beneath the point where the elevator buckets are discharged, are discharge or guard aprons 97, which guide the soil to the cross conveyer C. A suitable adjustable side shield 98 is also provided and may be rigidly secured to one of the vertical beams 74, depending upon the direction in which the cross conveyer C is moving. This shield also prevents the soil from falling upon any other portion of the apparatus while in operation. Conveyer C is secured to frame 15 by means of bars or rods 99. As the elevators are driven from power shaft 49 which operates the vertically disposed cutting shafts on the cutting frame, it will be noted that they both operate in unison.

Cross conveyer C preferably consists of a frame of channel beams 100, which are suspended in a suitable manner from the frame 15 as before described. Beams 100 are connected at either end by revoluble shafts 101—102 that are mounted in bearings secured to the inside of beams 100. Shafts 101—102 extend through one of the beams 100, and each is provided with a beveled gear 103—104, adapted to be thrown into or out of engagement with beveled pinions 105—106 (see Fig. 10), rigidly secured to the ends of a revoluble shaft 107, which is mounted in bearings secured to the conveyer frame 100. Gears 105—106 are thrown into or out of engagement with gears 103—104 by means of a yoke lever 108, the lever being held in different positions by means of sector 109, and spring pressed dog 110. It will be noted that by this arrangement I am enabled to rotate or operate the conveyer in the desired direction, so that it will discharge its contents into either of the adjustable conveyers 111—112. The endless apron of the conveyer may be of any preferred form, and for that reason I will not enter into a more extended or detailed description.

Rigidly secured to shaft 107 is a sprocket wheel 113, which is connected by chain 114 to sprocket 115 mounted on counter shaft 116, which shaft is mounted in bearings 117 secured to vertical beams 83. Sprocket 115 is connected to sprocket 118 mounted on power shaft 49 by chain 119.

It will be observed from the foregoing description that by providing sprockets of various pitches, the conveyer can be driven at any desired speed, and that it can be reversed with equal facility. When it is desired to stop the operation of the conveyer the gears 105—106 are moved out of engagement with the bevel gears 103—104. At each end of the conveyer C are arranged adjustable conveyers 110—111, and as one is the counter-part of the other, for convenience of description I will describe only one.

Conveyer 111 preferably consists of two side bars 126, on the inner and outer ends of which are mounted conveyer drums 127—128, over which the conveyer apron 129 is adapted to move. Shaft 130 on the inner end of conveyer 111 is revolubly mounted in a bifurcated bearing 131, which bearing is in swiveled engagement with the pedestal 132 secured to the main frame of the machine. Vertically mounted in pedestal 132 is a shaft 133, on the upper end of which is rigidly secured a beveled gear 134, which meshes with pinion 135 rigidly secured to a transverse shaft 136 revolubly mounted in bearings 137 secured to the bifurcated frame 131. One end of shaft 136 is provided with gear 138, which meshes with gear 139 rigidly mounted on one end of shaft 130. The lower end of shaft 133 has a bevel gear 140 that meshes with bevel pinion 141, rigidly secured to a revoluble shaft 142, mounted in bearings 143 secured to the main frame of the machine. The outer end of shaft 142 is provided with a sprocket 144, connected by chain 145 with sprocket 146 secured to shaft 49, through the medium of which the conveyer is driven. Sprocket 146 is provided with a clutch member 147 adapted to engage with a clutch member 148 slidably mounted on shaft 49 by means of lever yoke 149 pivotally attached at its lower end to an arm 150 secured to the frame of the machine. By means of lever 149 the conveyer can be thrown into or out of operation when desired. The outer end of the adjustable conveyers is provided with arms 155 secured to the side 126, and to their outer ends are secured cables 156, which pass upwardly and over sheaves 157 to a drum 158, loosely mounted on shaft 81. To one side of the drum 158 is secured a worm wheel 159 meshing with worm 160 secured to transversely extending channel bar 86, the outer end of the worm is provided with a handle 161. By means of the worm and wheel, the drum 158 is retained in a fixed position, thus retaining the adjustable conveyers 111—112 at the desired angle. Adjustable conveyers above described carry the material conveyed to them by the cross conveyer C to the desired point. Situated below the main drive shaft 26 is a traction counter shaft 162 rotatively mounted in bearings secured to the under side of the frame. Mounted on shaft 162 is a differential driving device of usual construction driven by gear wheel 163. Gear 164 loosely mounted on main drive shaft 26 meshes with gear 163. Gear 164 is provided with a clutch member 165 which is adapted to engage with a clutch member 166 slidably mounted on shaft 26 and controlled by lever yoke 167.

Lever yoke 167 is pivoted below shaft 26 to the frame and extends above the shaft to a horizontal arm 168 to which it is pivotally attached. Horizontal arm 168 is connected to controlling lever 169 on the operating platform 61.

Shaft 162 has gear pinions 170 rigidly mounted on its ends, meshing with gears 171 rigidly secured to traction wheels 20. When it is desired to drive the machine from one place to another, clutch member 166 is thrown into engagement with member 165, thereby rotatively locking gear 164 to the main drive shaft. Shaft 162 is then driven through the medium of gear 163 and in turn drives the traction wheels 20 through the medium of pinions 170 and gears 171.

Rigidly mounted on shaft 49 is a bevel gear 172 which drives a second and smaller bevel 173 mounted on shaft 174. Shaft 174 is mounted in bearing 175 which has an extension 176 surrounding and supported by shafts 49 and 162. Shaft 174 has a worm 177 rigidly mounted upon it to mesh with gear 178 loosely mounted upon shaft 162. Gear 178 is provided with a clutch member 179 which is adapted to engage with a member 180 slidably mounted on shaft 162. Member 180 is controlled by lever yoke 181 which is pivoted to the frame below shaft 162 and extends upwardly to a horizontally disposed arm 183 to which it is pivotally secured. Horizontally disposed arm 183 is connected with controlling lever 184 mounted on the operating platform 61. When it is desired to drive the machine slowly forward clutch member 180 is thrown into engagement with member 179, thereby locking gear 178 to shaft 162. The revolution of shaft 49 then transmits motion to shaft 162 through bevels 173 and 172 and worm 177. Shaft 162 in turn drives the traction wheels through the aforementioned pinions 170 and gears 171.

When it is desired to drive the apparatus to other fields of operation, the friction clutch member is first thrown to its inoperative position, so as to disconnect the various conveying and cutting mechanisms of the apparatus. Controlling lever 200 on the operating platform, which is pivotally connected at its lower end to a horizontal pull rod 201, whose other end is pivotally connected to the upper end of a reversing lever 202 pivotally secured to the engine frame, is then operated, thereby reversing the engine and propelling the apparatus through the medium of the traction wheels forwardly.

Guide wheel 17 is mounted in a bifurcated bearing 205 and turns on a vertically disposed pivoted arm 206, mounted in a pedestal 207 rigidly secured to cross "I" beams 208, secured to the frame of the machine. Rigidly secured to the upper end of arm 206 is a segmental worm wheel 209 which meshes with a worm 210 rigidly mounted on revoluble shaft 211 mounted in bearings 212 secured to main frame 15. Mounted on shaft 211 is a sprocket 213 connected to sprocket 214 by chain 215. Sprocket 214 is mounted on a revoluble shaft 216, mounted in bearings 217 secured to the operating platform of the apparatus. Shaft 216 is provided with an operating handle 218 by means of which the operator can control the direction of the machine when the traction mechanism is in operation.

The operation of the apparatus is as follows: When the machine is in an operative position as shown in Fig. 1, friction clutch member 55 is thrown into engagement with member 54, thereby locking gear wheel 51 rigidly to shaft 26. Gear wheel 51 meshes with and drives gear wheel 50 rigidly mounted on shaft 49, which in turn drives the cutters 35 as has been hereinbefore explained. Clutch member 180 is now thrown into engagement with clutch member 179, thereby rotatively connecting shaft 49 to shaft 162 as has been described, imparting to shaft 162 a relatively slow rotation. Shaft 162 in turn drives the traction wheels to move the machine towards the bank through the medium of pinions 170 and gears 171. By this arrangement the machine is moved slowly towards the bank as fast as the cutters remove the soil, the soil falling to the bottom of the cut made by the machine and more or less directly into the path of the main elevators B which are driven as has been before mentioned, always in unison with the cutting mechanism. These elevators operate to convey the material detached by the cutters away from the bottom of the cutting frame, and up to the top of the machine, where it is discharged over the aprons or guides to the cross conveyer C. This conveyer then conveys the material to one side or the other of the machine, and delivers it onto one of the adjustable conveyers. As will be noted by the drawings either of the adjustable side conveyers may be thrown into operation, it depending entirely upon which side it is desired to deliver the material that has been removed by the cutting mechanism. For instance, if it is found desirable to deliver the material to conveyer 125, lever 108 is operated so as to bring beveled pinion 106 into engagement with gear 104, thereby driving cross conveyer C in the direction of conveyer 125, and at the same time throwing conveyer 124 out of operation, which may be swung around until its outer end rests on a support 203, which in this instance I have illustrated as an "I" beam secured to one of the cylinders of the engine. These elevators are adjustably mounted so that by means of cables they may be elevated or depressed to suit the existing conditions. If, for instance, the apparatus is so situated that wagons could be advantageously used, then the conveyer is depressed to the proper angle so as to discharge directly into them, thereby effecting a saving in time, labor and expense. If the conditions are such that wagons could not be used, then the conveyer may be elevated into a position so that it may elevate the material upwardly and onto a bank.

It will be observed from the foregoing description that I have constructed an apparatus that is comparatively simple in construction and one in which the various sub-mechanisms are uniformly distributed in operative relation to each other. It will be further observed that by having the controlling levers arranged at a single point, the various mechanisms can be instantly controlled, and that it will require only the services of one man.

As will be noted from the foregoing description, by the adjustability of the cutting mechanism I am enabled to cut upwardly, downwardly or on a level, thereby rendering the apparatus one of great utility, that could with equal facility be used in lieu of an apparatus especially designed for use in a single situation.

When using the apparatus for excavating, the cutting frame A is first depressed so that only the lower tools on the vertical shafts are cutting. As the apparatus is fed forwardly and the traction wheels enter the incline formed by the lower cutters, other cutters are brought into operation until the apparatus is utilizing all of its cutting tools. It will be observed from the foregoing that I am enabled to form excavations of almost any desired depth.

Having described my invention, what I claim as new and desire to secure by Letters Patent is:—

1. In an apparatus of the class described, the combination of a main frame; of a frame carrying cutting mechanism pivotally secured to said main frame; elevating means secured to the frame carrying the cutting means; cross conveying means secured to said main frame, said means adjacently disposed to the discharge end of said elevating means; and motive means secured to the main frame, whereby the said cutting, elevating and conveying means are operated in unison.

2. In an apparatus of the class described, the combination of a main frame mounted on wheels; a frame carrying cutting mechanism pivotally secured to said main frame; elevating means secured to the frame carrying the cutting means; cross conveying means secured to said main frame; said means adjacently disposed to the discharge end of said elevating means; and motive means secured to the main frame, whereby the said cutting, elevating and conveying means are operated in unison.

3. In an apparatus of the class described, the combination of a main frame; of a frame carrying cutting mechanism pivotally secured to said main frame; means secured to said frame carrying cutting mechanism, whereby said frame may be adjusted; elevating means located adjacent the cutting mechanism; cross conveying means secured to said main frame, said means adjacently disposed to the discharge end of said elevating means; and motive means secured to the main frame, whereby the said cutting, elevating and conveying means are operated in unison.

4. In an apparatus of the class described, the combination of a main frame; of a frame carrying cutting mechanism pivotally secured to said main frame; means secured to said frame carrying cutting mechanism, whereby said frame may be adjusted vertically; elevating means located adjacent the cutting mechanism; cross conveying means secured to said main frame, said means adjacently disposed to the discharge end of said elevating means; and motive means secured to the main frame, whereby the said cutting, elevating and conveying means are operated in unison.

5. In an excavating apparatus, the combination of a main frame; of a frame carrying cutting mechanism pivotally secured to said main frame; elevating means secured to said frame carrying the cutting means; cross conveying means secured to said main frame, said means adjacently disposed to the discharge end of said elevating means; adjustable cross conveyers, one secured at each end of said cross conveying means; and motive means secured to the main frame, whereby the said cutting, elevating and conveying means are operated simultaneously.

6. In an excavating apparatus, the combination of a main frame; of a frame carrying cutting mechanism pivotally secured to said main frame; elevating means secured to said frame carrying the cutting means; cross conveying means secured to said main frame, said means adjacently disposed to the discharge end of said elevating means; means secured to the cross conveying means, whereby its direction may be reversed; adjustable cross conveyers, one secured at either end of said cross conveying means; and motive means secured to the main frame, whereby the said cutting, elevating and conveying means are operated simultaneously.

7. In an excavator, a main frame; an auxiliary frame secured to said main frame; a plurality of vertically disposed revoluble shafts journaled in said auxiliary frame; a series of cutting tools secured to said shaft; means secured to said main frame to rotate said shafts; and adjusting means secured to said main frame, whereby the auxiliary frame may be adjusted.

8. In an excavating, grading and conveying machine, the combination of a main frame mounted on traction wheels; of a frame having a plurality of vertically disposed revoluble shafts; a series of cutting tools secured to said shafts; means to rotate said shafts; a plurality of elevators secured to said main frame adjacent the said cutting frame; a cross conveyer secured to said main frame, adjacent the discharge end of said elevators; means to control the direction of rotation of said conveyer; adjustable cross conveyers, one secured at each end of said cross conveyer; means to control the adjustment of said adjustable conveyers; and motive means secured to the main frame, whereby the said cutting, elevating and conveying means are operated in unison.

9. In an apparatus of the class described, the combination of a main frame; of a frame carrying cutting mechanism pivotally secured to said main frame; elevating means secured to the frame carrying the cutting means; cross conveying means secured to said main frame, said means adjacently disposed to the discharge end of said elevating means; adjustable conveying means located at each end of the cross conveying means; means for feeding the apparatus forwardly when the cutting mechanism is in operation; and motive means secured to said main frame, whereby the said cutting, elevating and conveying means are operated in unison.

10. In an apparatus of the class described, the combination of a main frame; of a frame carrying a plurality of cutting mechanisms adapted to be operated simultaneously, pivotally secured to said main frame; means to control the adjustment of said frame carrying the cutting mechanism; elevating means secured to said frame carrying the cutting mechanism and operable therewith; cross conveying means secured to said main frame, said means adjacently disposed to the discharge end of said elevating means; means to reverse the direction of said conveying means; means to feed the apparatus forwardly during its operation; means to disconnect said cutting, elevating and conveying means when the apparatus is driven the reverse of the cutting direction; and motive means secured to the frame to operate the various mechanisms.

11. In an excavating apparatus, the combination of a main frame, of a frame carrying cutting mechanism pivotally secured to said main frame, elevating means secured to the frame carrying the cutting mechanism, cross conveying means secured to said main frame, said means adjacently disposed to the discharge end of said elevating means, means to control the direction of rotation of said conveying means, and motive means secured to said frame, whereby said cutting, elevating and conveying means are operated in unison.

12. In an apparatus of the class described, the combination of a main frame, of a frame carrying cutting mechanism secured to said main frame, means to vertically adjust the frame carrying the cutting mechanism, elevating means secured to the frame carrying the cutting mechanism, cross conveying means secured to said main frame, said means adjacently disposed to the discharge end of said elevating means, means to control the direction of rotation of said conveying means, and motive means secured to said main frame, whereby said cutting, elevating and conveying means are operated in unison.

In witness that I claim the foregoing I have hereunto subscribed my name this 28th day of January, 1907.

PETER J. THULL.

Witnesses:
 EDMUND A. STRAUSE,
 HENRY T. HAZARD.